(12) United States Patent
Printezis et al.

(10) Patent No.: US 7,287,049 B1
(45) Date of Patent: Oct. 23, 2007

(54) TRACKING MINIMUM MUTATOR UTILIZATION (MMU) CONSTRAINTS IN A GARBAGE-COLLECTION SYSTEM

(75) Inventors: Antonios Printezis, Burlington, MA (US); David L. Detlefs, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 456 days.

(21) Appl. No.: 10/879,332

(22) Filed: Jun. 29, 2004

(51) Int. Cl.
*G06F 17/30* (2006.01)
(52) U.S. Cl. .................................... 707/206
(58) Field of Classification Search ............... 707/206, 707/100; 711/159, 165, 171, 173
See application file for complete search history.

(56) References Cited

U.S. PATENT DOCUMENTS 6,526,421 B1 * 2/2003 Houldsworth ............... 707/206

OTHER PUBLICATIONS

Perry Cheng , Scalable Real-time Parallel Garbage Collection for Symmetric Multiprocessors, Carnegie Mellon University, http://reports-archive.adm.cs.cmu.edu/anon/2001/CMU-CS-01-174.pdf, Sep. 27, 2001, pp. 1-151.*

Scott Nettles et al., Real-Time Replication Garbage Collection, ACM-Sigplan-PLDI-6/93/Albuquerque, N.M. @1993 ACM 0-89791-598-4/93/0006/0217, p. 217-225.*
James O'Toole et al., Concurrent Replicating Garbage Collection, www.tesla.lcs.mit.edu/history/publication., Jun. 10, 1998, pp. 1-8.*
Cheng, Perry, Blelloch, Guy E., "A Parallel, Real-Time Garbage Collector", Computer Science Department, Canegie Mellon University, 2001 (12 pages).
Bacon, David F., Cheng, Perry, Rajan, V.T., "A Real-time Garbage Collector with Low Overhead and Consistent Utilization", IBM T.J. Watson Research Center, Jan. 15-17, 2003. (14 pages).

* cited by examiner

*Primary Examiner*—Don Wong
*Assistant Examiner*—Hung Tran Vy
(74) *Attorney, Agent, or Firm*—Osha• Liang LLP

(57) ABSTRACT

A garbage collector keeps a log of recent system usage. From that usage thus recorded, it determines whether a time slice whose duration a maximum-mutator-utilization ("MMU") specification prescribes and whose end time is the same as a prospective future collection pause will contain more than the maximum imposed by the MMU specification on the time slice's garbage collector time. The collector uses that determination to arrive at a compliant length for a pause that is to start at a predetermined time or to find a time at which a pause of a predetermined length can start without violating the MMU specification.

16 Claims, 10 Drawing Sheets

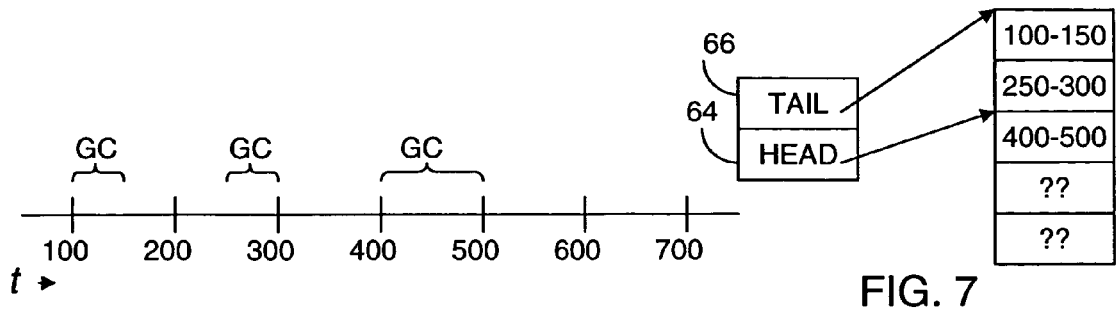
FIG. 6
FIG. 7
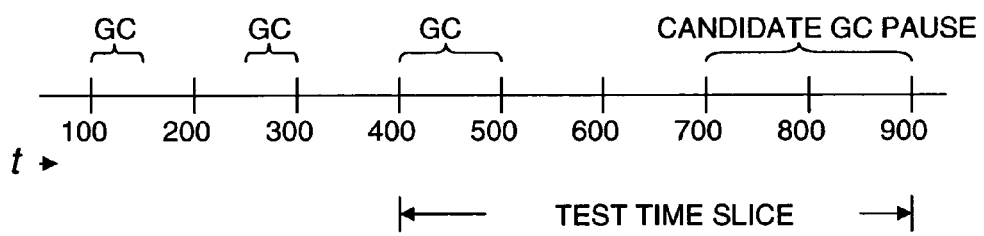
FIG. 8
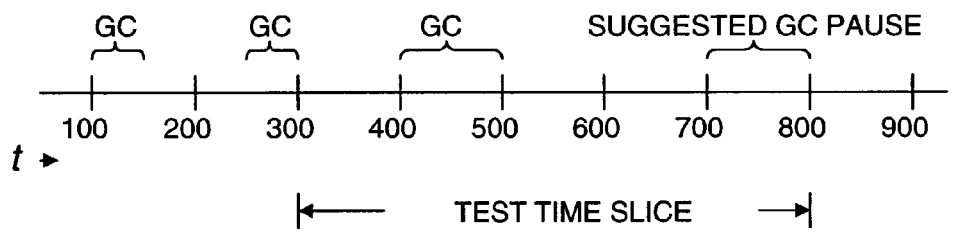
FIG. 10
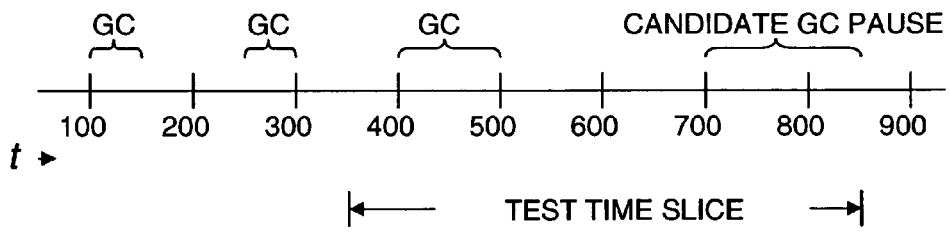
FIG. 12
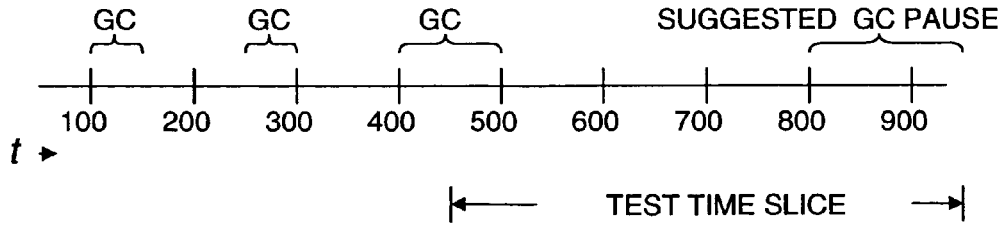
FIG. 13

TRACKING MINIMUM MUTATOR UTILIZATION (MMU) CONSTRAINTS IN A GARBAGE-COLLECTION SYSTEM

BACKGROUND OF THE INVENTION

1. Field of the Invention

The present invention concerns computer-program compiling and in particular to what has in that discipline come to be referred to as "garbage collection."

2. Background Information

Garbage collection is the term that has come to be used for the operations by which data objects that a program will no longer use are recognized so that the computer memory occupied by those objects can be reclaimed for reuse. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. An object also may belong to a class, which is an organizational entity that may contain method code or other information shared by all objects belonging to that class. In the discussion that follows, though, the term object will not be limited to such structures; it will additionally include structures with which methods and classes are not associated.

Garbage collection is used almost exclusively in environments in which memory can be allocated to some objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data that a microprocessor 11 uses and instructions for operating on them may reside in onboard cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14. Those caches would swap data and instructions with the RAM 14 just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Some computer systems may employ a plurality of processors so that different processes' executions actually do occur simultaneously. Such systems come in a wide variety of configurations. Some may be largely the same as that of FIG. 1 with the exception that they include more than one microprocessor such as processor 11, possibly together with respective cache memories, sharing common read/write memory by communication over the common bus 16.

In other configurations, parts of the shared memory may be more local to one or more processors than to others. In FIG. 2, for instance, one or more microprocessors 20 at a location 22 may have access both to a local memory module 24 and to a further, remote memory module 26, which is provided at a remote location 28. Because of the greater distance, though, port circuitry 29 and 30 may be necessary to communicate at the lower speed to which an intervening channel 32 is limited. A processor 34 at the remote location may similarly have different-speed access to both memory modules 24 and 26. In such a situation, one or the other or both of the processors may need to fetch code or data or both from a remote location, but it will often be true that parts of the code will be replicated in both places.

Despite these expedients, the use of static memory allocation in writing certain long-lived applications makes it difficult to restrict storage requirements to the available memory space. Abiding by space limitations is easier when the platform provides for dynamic memory allocation, i.e., when the platform enables allocation of memory space to be delayed until after the program has been loaded and is already running.

Dynamic allocation has a number of advantages, among which is that the run-time system is able to adapt allocation to run-time conditions; for given objects the programmer can specify respective conditions on which space should be allocated to them. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways.

This kind of error is known as a "dangling reference," because an application should not retain a reference to a memory location once that location is reclaimed. Explicitly managing dynamic memory by using interfaces like malloc( )/ free( ) often leads to these problems.

Such leaks and related errors can be made less likely by reclaiming memory space more automatically. As was mentioned above, the software and/or hardware used for this purpose is typically referred to as a garbage collector. Garbage collectors operate by inspecting the running program's current state, determining from that state whether it can decide that there are some objects that the program can no longer reach, and reclaiming objects thus found not to be reachable. The criteria that garbage collectors use for this purpose vary, but, for example, a program's global variables are normally considered reachable throughout a program's life. Although they are not ordinarily stored in the memory space that the garbage collector manages, they may contain references to dynamically allocated objects that are, and the garbage collector will consider such objects reachable. It will typically also consider an object reachable if it is referred to by a reference in a register or a thread's call stack. And reachability is contagious: if a reachable object refers to another object, that other object is reachable, too.

It is advantageous to use garbage collectors because, whereas a programmer working on a particular sequence of code can perform his task creditably in most respects with only local knowledge of the application, memory allocation and reclamation tend to require more-global knowledge. A programmer dealing with a small subroutine, for example, may well be able to identify the point in the subroutine beyond which the routine has finished with a given memory portion, but knowing whether the application as a whole will be finished with it at that point is often much more difficult. In contrast, garbage collectors typically work by tracing references from some conservative notion of a "root set," e.g., global variables, registers, and the call stack: they thereby obtain reach-ability information methodically. By using a garbage collector, the programmer is relieved of the need to worry about the application's global state and can concentrate on (more-manageable) local-state issues. The result is applications that are more robust, having no dangling references and fewer memory leaks.

Garbage-collection mechanisms can be implemented by various parts and levels of a computing system. One approach is simply to provide them as part of a batch compiler's output. Consider FIG. 3's simple batch-compiler operation, for example. A computer system executes in accordance with compiler object code and therefore acts as a compiler 36. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling.

The input to the compiler is the application source code, and the end product of the compiler process is application object code. This object code defines an application 38, which typically operates on input such as mouse clicks, etc., to generate a display or some other type of output. This object code implements the relationship that the programmer intends to specify by his application source code. In one approach to garbage collection, the compiler 36, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of hardware that lends itself particularly to use in garbage collection. So even a very simple system may disperse the garbage-collection mechanism over a number of computer-system layers.

To get some sense of the variety of system components that can be used to implement garbage collection, consider FIG. 4's example of a more complex way in which various levels of source code can result in the machine instructions that a processor executes. In the FIG. 4 arrangement, the human applications programmer produces source code 40 written in a high-level language. A compiler 42 typically converts that code into is "class files." These files include routines written in instructions, called "byte code" 44, for a "virtual machine" that various processors can be software-configured to emulate. This conversion into byte code is almost always separated in time from that code's execution, so FIG. 4 divides the sequence into a "compile-time environment" 46 separate from a "run-time environment" 48, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 50. That process emulates a virtual machine from whose instruction set the byte code is drawn. As is true of the compiler 42, the virtual-machine process 50 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine.

In some implementations, much of the virtual machine's action in executing these byte codes is most like what those skilled in the art refer to as "interpreting," so FIG. 4 depicts the virtual machine as including an "interpreter" 52 for that purpose. In addition to or instead of running an interpreter, many virtual-machine implementations actually compile the byte codes concurrently with the resultant object code's execution, so FIG. 4 depicts the virtual machine as additionally including a "just-in-time" compiler 54.

The resultant instructions typically invoke calls to a run-time system 56, which handles matters such as loading new class files as they are needed and includes much of garbage-collector implementation. The run-time system will typically call on the services of an underlying operating system 58. Among the differences between the arrangements of FIGS. 3 and 4 in that FIG. 4's compiler 40 for converting the human programmer's code does not contribute to providing the garbage-collection function; that results largely from the virtual machine 50's operation.

Independently of the specific system-architecture levels at which the collector resides, garbage collection usually includes some amount of reference tracing to determine whether objects are at least potentially reachable; if they are not potentially reachable, they are garbage, and their memory space can therefore be reclaimed. The most straight-forward and accurate way to do the tracing is to start at the root set and scan recursively for referred-to objects until all have been identified. If an object is not encountered in that process, it is not reachable, even if it is referred to by a reference in some other object.

But that process can be quite time-consuming in many applications, and the nature of many applications is such that making the mutator pause while an entire tracing process proceeds to conclusion would be unacceptable. So some collectors operate "space-incrementally." In each successive collection increment, which typically (but not necessarily) is all performed during a single pause in mutator execution, the collector considers a small portion, or collection set, of the heap. For respective regions of the heap, the collector keeps track of the references in other regions that refer directly to objects in those regions. A collection-set object can be recognized as unreachable if no reference chain from such a reference outside the collection set includes it.

Space-incremental garbage collectors can be so tuned as to tend to limit pause times. A typical approach is based on dividing the heap into generations, which are subject to different allocation and collection policies. In the typical, two-generation arrangement, the collector places all or most newly allocated objects into a first, young generation, which is usually relatively small. Typically when the young generation becomes full or reaches some other predetermined occupancy level, the collector interrupts the mutator to reclaim memory occupied by unreachable young-generation objects. Objects that "survive" such a collection some predefined number of times are "promoted" into the other, mature generation, typically by being copied into it. Some implementations trigger a collection pause whenever the young generation reaches a predetermined percentage of its capacity. In such systems, the user can affect such a collector's collection-pause duration by adjusting the young generation's size and/or the amount of mature-generation space each collection set includes.

To adjust such parameters effectively, though, the user has to have a good idea of the relationship between collection pause and adjustment parameters such as the young generation size and the amount of mature-generation space each collection set includes. Moreover, what users really are interested in is not just collection pause time but overall system utilization by the mutator. For example, it will not ordinarily be considered satisfactory for a collector to meet a desired a 50-msec. pause-time requirement if it allows only 1 msec. of mutator operation between collection pauses.

So Bacon et al. proposed a more direct approach in "A Real-Time Garbage Collector with Low Overhead and Consistent Utilization," *Conference Record of the Thirtieth Annual ACM Symposium on Principles of Programming Languages*, New Orleans, La., January 2003. The collector described in that paper simply divides program operation into predetermined time slices, of which some are dedicated to mutator operation and others to collector operation. The first 10 msec. of each 12-msec. time slice could be dedicated to mutator operation, for example, while the last 2 msec. would be dedicated to collection. Such an approach not only imposes a limit on pause times but also tends to result in a desired degree of mutator utilization.

SUMMARY OF THE INVENTION

We have developed a technique that enables a collector to achieve desired mutator utilization more flexibly. Our technique is to maintain data structures that provide a basis for determining whether proposed collection pauses will satisfy a minimum-mutator-utilization ("MMU") specification. Such a specification, of which the archetype was introduced in Cheng et al., "A Parallel, Real-Time Garbage Collector, *Proceedings of the ACM SIGPLAN '01 Conference on Programming Language Design and Implementation*, pp. 125-136, June 2001, Snowbird, Utah, includes two parts. The first part is a predetermined time-slice duration, and the second part is a predetermined percentage. According to an MMU specification, at least the predetermined percentage of computer-system usage during every time slice of a program's execution having the given duration should be devoted to executing that program's mutator as opposed to its garbage collector.

In this specification, the time slices "roll": the condition should be satisfied for every time slice of that duration, independently of when the time slice starts. So there are infinitely many time slices in the portion of the program's execution to which the specification is applied, and the percentage requirement should be satisfied for all of them.

We have recognized that, by recording recent system usage—i.e., by keeping track of which recent periods were dedicated to collector (or, conversely, mutator) execution, the collector can tend to meet an MMU specification in a flexible manner. While the Bacon et al. approach mentioned above enables the collector to meet an MMU specification, too, it does not allow the irregular pause-occurrence patterns that for many collectors produce the most-efficient operation.

Most of the invention's embodiments will employ the invention for one or both of two situations. In one situation, the collector needs to determine how much collection work to allow during a given collection pause that will begin at a given time. In the other situation, the collector needs to determine how long it should wait before allowing a collection pause of a given duration. In both situations, the collector employs the recent-utilization record together with an estimate of a candidate collection set's collection time to find a time slice that (1) has the specified time-slice duration, (2) ends with completion of the candidate collection set's collection, and (3) has at least the predetermined percentage devoted to meeting the MMU specification. To the extent that the estimates are accurate, the program as a whole will meet the MMU specification.

BRIEF DESCRIPTION OF THE DRAWINGS

The invention description below refers to the accompanying drawings, of which:

FIG. 5 is a time-line diagram depicting a portion of a typical collection sequence in a "garbage-first" garbage collector;

FIG. 6 is a time-line diagram depicting division between mutator and garbage-collector utilization;

FIG. 7 is a data-structure diagram depicting a log of the utilization that FIG. 6 illustrates;

FIG. 8 is a time-line diagram similar to FIG. 6 but additionally depicting a test time slice and candidate pause used to compute a collection-pause recommendation;

FIG. 10 is a time-line diagram similar to FIG. 8 but depicting a different stage in the computation that FIG. 9 represents;

FIG. 12 is a time-line diagram similar to FIG. 8 but depicting a stage in the computation that FIG. 11 depicts;

FIG. 13 is a time-line diagram similar to FIG. 12 but depicting a different stage in the computation that FIG. 11 depicts.

DETAILED DESCRIPTION OF AN ILLUSTRATIVE EMBODIMENT

Figure 1:
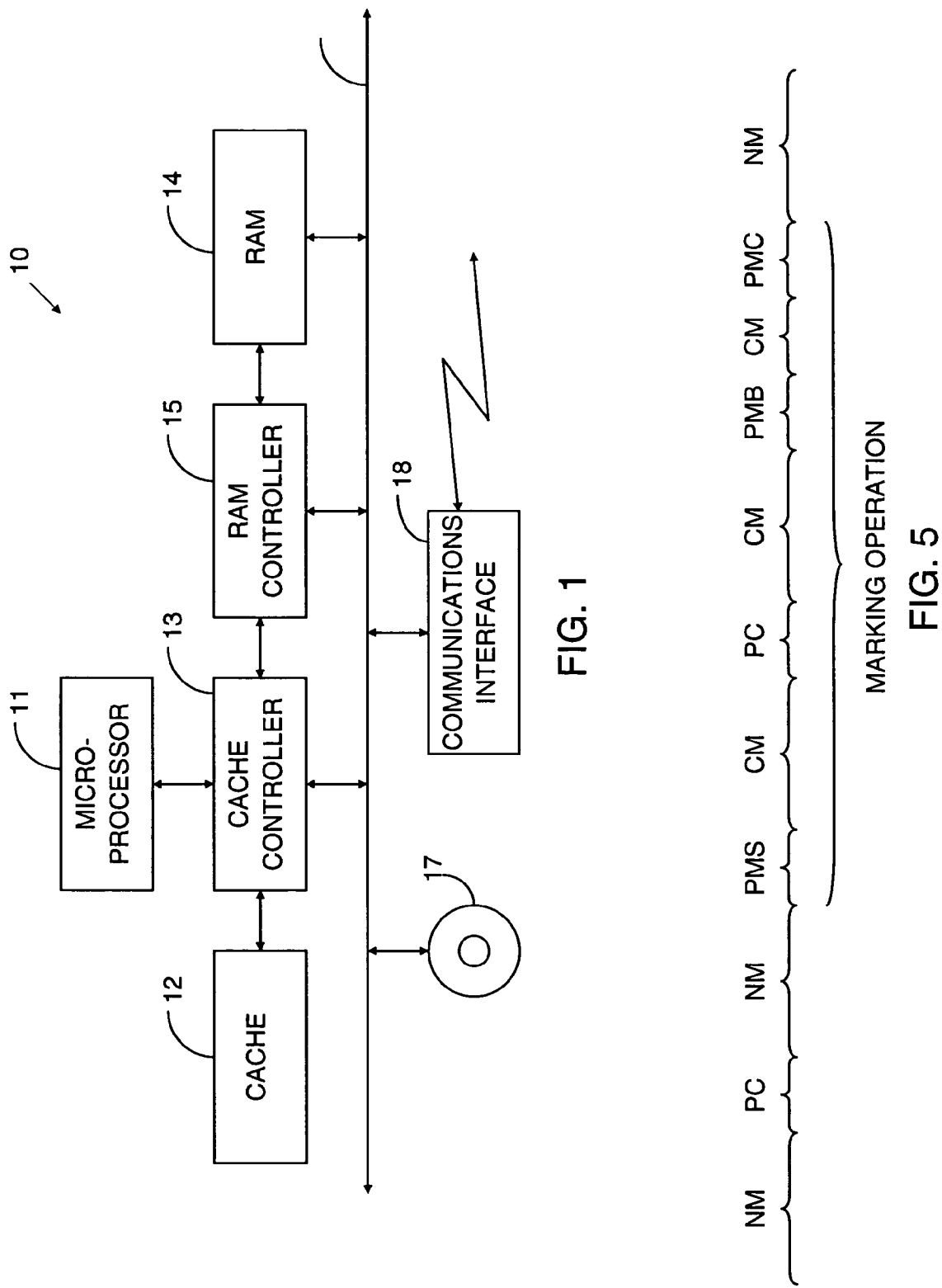
FIG. 1, discussed above, is a block diagram that illustrates a typical computer system in which the present invention's teachings may be practiced.
Figure 2:
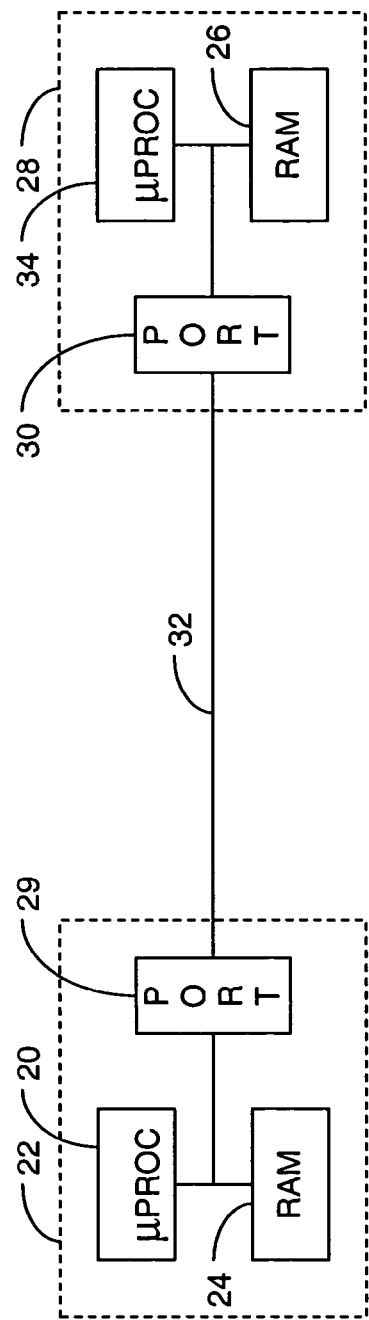
FIG. 2, discussed above, is a block diagram of a multi-processor computer system, which can also use the present invention's teachings.
Figure 3:
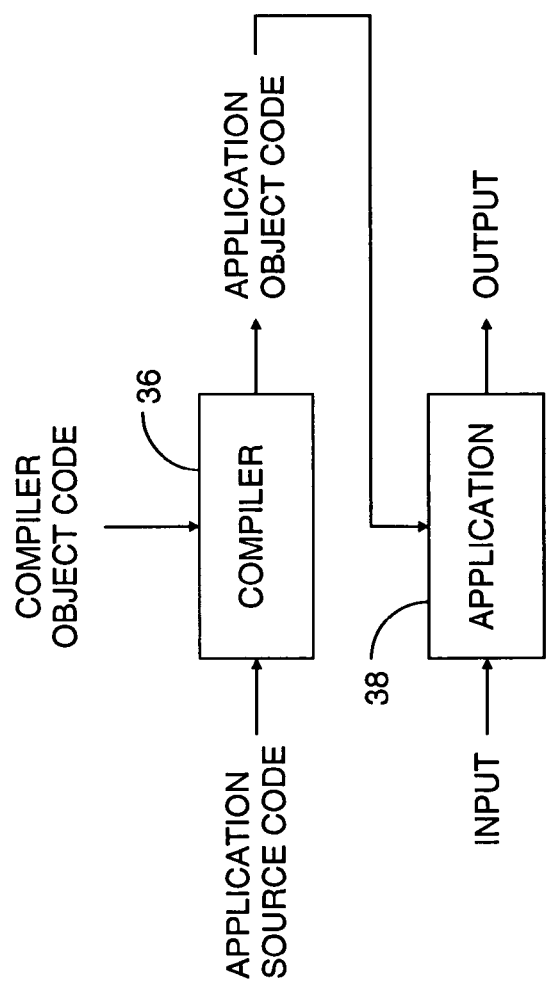
FIG. 3, discussed above, is a block diagram that illustrates the relationship between a compiler and the resultant application program.
Figure 4:
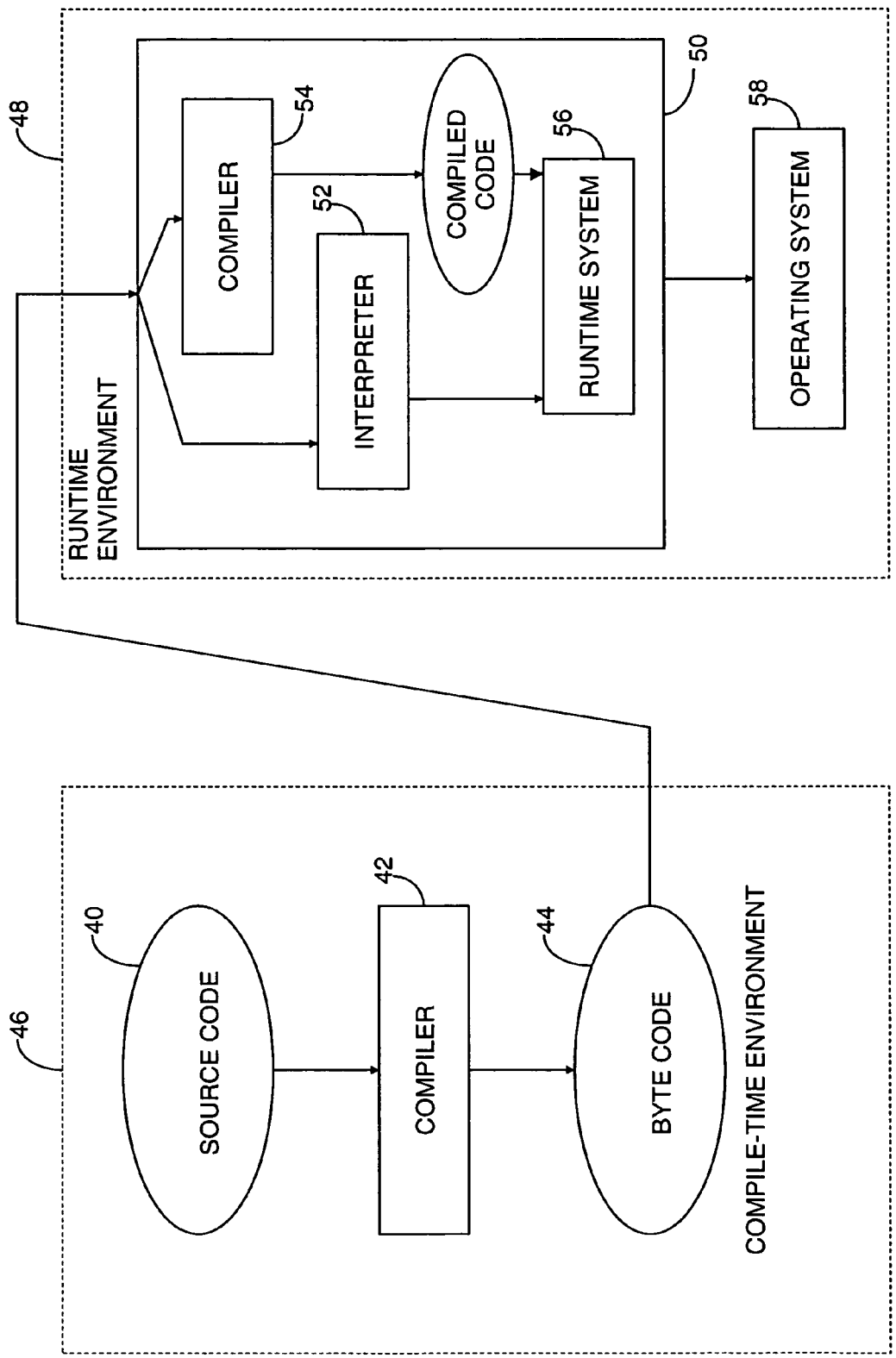
FIG. 4, discussed above, is a block diagram that illustrates another way in which source code can result in an executing program.

Garbage collectors that employ the present invention's teachings will provide what we will refer to as an "MMU tracker," which enables the collector to take an MMU specification into account in a flexible way to schedule garbage-collection pauses. To appreciate the value of such flexibility, consider one of the many types of collectors in which the present invention's teachings can be employed.

This example, which we refer to as the "garbage-first" strategy, employs a space-incremental approach to collection. It is distinguished by the way in which it selects the regions that it will include in a collection set. As is described in U.S. patent application Ser. No. 10/799,049, which was filed on Mar. 12, 2004, by Detlefs et al. for Garbage-First Garbage Collection, the regions are selected in a way that tends to result in the most space reclamation for a given amount of time dedicated to collection.

To determine which regions are most attractive in this regard, the collector from time to time performs a heap-wide marking of heap objects. Normally, the collector performs most of the marking operation concurrently with mutator operation, but there are aspects of the marking operation for which the mutator must be interrupted. The resultant pattern of activity may therefore be something like the one depicted by FIG. 5, which is a time line that shows how marking may be interleaved with other collector operations. The time line joins the program's execution at a point where the last marking cycle has been completed. Its first interval bears an "NM" legend to indicate that that no marking is in progress and that the mutator is not otherwise interrupted. This does not necessarily mean that the collector is idle; it may, for instance, be maintaining the remembered sets concurrently with mutator operation. In a multiprocessor environment, this may mean that the mutator is executing on one or more of the processors simultaneously with the collector's remembered-set-maintenance operation on one or more other processors.

The next, "PC" interval represents a pause for collector copying. During this interval, the mutator is interrupted so that the collector can move reachable objects and update references to them in a way that is atomic with respect to mutator activity. The time line follows this with another non-marking ("NM") interval to indicate that the mutator has resumed execution.

At some point a decision is made to start a marking cycle. Although, as was mentioned above, marking is largely concurrent with mutator execution, some parts may require interrupting the mutator, so the time line includes an interval representing a pause for mark start-up ("PMS"), during which the mutator does not execute. Most marking activity is concurrent, though, and the next interval represents concurrent marking ("CM"), during which the mutator can execute. Again, the concurrent operations may be taking place in different processors simultaneously in a multiprocessor environment.

As subsequent intervals indicate, that marking and the concurrent mutator execution may be interrupted from time to time for collector-copying pauses ("PC"). Eventually, the marking operation will require other threads to pause ("PMB") to complete its inspection of information left it by so-called write barriers that the mutator threads execute. Some more concurrent marking ("CM") then occurs, after which the marking ends with a pause for marking clean-up ("PMC"), during which mutator threads are again suspended.

For the sake of illustration, the interval durations' dynamic range is depicted as much smaller than typical. Some of the collection pauses, particularly those for collection copying, can take quite a while; a typical duration is in the range of 100 msec. to 200 msec. In comparison with such pauses, certain marking pauses may be relatively short; their durations may be, say, 20 msec. to 30 msec. If the above-mentioned Bacon approach is used to conform pauses to an MMU specification, a single such brief pause would delay the commencement of any subsequent pause until a full-length mutator interval has occurred. If the PMB and PMC pauses mentioned above turned out actually to be very short, for example, they could greatly delay a needed copying pause even such conformance with the MMU specification does not require such a delay; collection activity would be suppressed unnecessarily. As will become apparent, the present invention can enable a collector to comply with an MMU specification without such strictures.

For the sake of example, we will describe the invention as being implemented in a space-incremental collector. As was mentioned above, such a collector typically treats the heap that it manages as divided into regions, of which a given collection set will include one or more but usually less than all. To avoid the need during every collection increment to search the whole heap for reference chains to collection-set objects, many incremental-collector implementations maintain for each region a respective remembered set, or list of locations where it has previously encountered references to that region's objects.

To keep remembered sets complete, the mutator's reference-writing operations are typically provided with write barriers, i.e., mutator operations that communicate to the collector the locations where the mutator has written references. The mutator can perform that communication by placing the written-to location's identity into the remembered set associated with the region to which the written-to location refers. More typically, the mutator simply informs the collector of the written-to location, and the collector handles placing the location's identity into the appropriate remembered set. In many implementations the collector is selective in performing that placement. For example, a typical approach in the case of a two-generation collection is to include in the remembered set for a mature-generation region the identities only of mature-generation locations.

In any event, the basic collection concept, as was mentioned above, is to find objects to which there are no reference chains from the root set. In the two-generation example described here, though, the space-incremental collector greatly reduces the reference-tracing effort, because it stops tracing any chain when that chain reaches the mature generation. True, such a chain may ultimately lead to a collection-set object and thereby identify that object as one whose space should not be reclaimed. But such an object will be referred to from a location identified by the remembered set associated with the region to which that object belongs. So, instead of laboriously following all reference chains through the mature generation, the collector merely scans the locations that the collection-set regions' remembered sets identify. Any collection-set objects thereby referred to will be considered potentially reachable, and the collector will not reclaim their memory space, at least not without copying them to new locations. On the other hand, space occupied by objects not found to be reachable can be safely reclaimed, even though the collector has not completely traced all reference chains from the root set.

These and other collector operations take time, and a collector policy may be to avoid excessively long mutator pauses and/or not to take too much time away from mutator execution. To implement policies of that general type, embodiments of the present invention will maintain a system-utilization log to track MMU. The type of log employed for that purpose is not critical, and it will depend on the type of computer system involved, the desired degree of accuracy, etc., but FIGS. 6 and 7 depict one possible approach.

FIG. 6 is a time line that depicts a program's execution. A garbage-collection interval begins at time t=100 msec. and ends at t=150 msec. Another garbage-collection interval extends between times t=250 msec. and t=300 msec., after which a third interval starts at t=400 msec. and ends at t=500 msec. For the sake of simplicity, we will assume here a single-processor system running only a single process, consisting of a mutator and its garbage collector, so the time values can simply be clock times. In other embodiments they may be elapsed process time, for instance. Also for the sake of simplicity, we will assume that the three intervals just mentioned above are devoted exclusively to collector operation—i.e., there are no mutator threads running in parallel with the collector—and that all other intervals are dedicated to mutator operation exclusively.

The particular approach used to maintain a usage log is not critical to the invention. Under the just-mentioned assumptions, though, a relatively accurate log of processor utilization can be maintained in an array such as FIG. 7's array 62. In that array, each array entry represents a collection interval. The array may be implemented as a fixed-size and -position circular array with which pointers 64 and 66 to the head and tail entries are associated. As will be seen below, the only time intervals of interest are those that end no more than the MMU specification's time-slice duration before the current time, so, to make room for new entries, the collector can from time to time (circularly) advance the tail ahead of entries representing intervals that ended before then.

The array will typically be made large enough that this expedient keeps enough room in the array. If a situation arises in which the number of intervals nonetheless exceeds the array's capacity more memory can be allocated to it, of course. Alternatively, one can simply delete the tail entry, although this will yield an inaccuracy that will make the MMU specification more likely to be violated. Another alternative is to combine adjacent entries into a single entry containing the first entry's start time and the second entry's end time. Such an approach will make MMU-specification violations less likely, but it may also make it more likely that needed collection fails to occur.

FIG. 7 suggests that each entry includes values representing the interval's start and stop times. This is a convenient approach, since the collector can make an entry each time a collection interval occurs. For example, the collector can perform an MMU-tracker-update operation each time a collection pause occurs, or at least each time a collection pause occurs that meets certain criteria, such as a minimum duration below which the collector chooses to ignore the pause for MMU-tracking purposes. When the pause occurs, the collector notes the pause's start and end times and, if the head and tail pointers do not point to the same entry, places the start and end values in the entry that the head pointer designates. It would also advance the head pointer and, possibly, advance the tail pointer past any entries that are no longer of interest, i.e., that contain end-time entries that precede the current time by more than the MMU-specification time slice.

This entry format is not the only format possible, of course. For example, the entry can instead take the form of an interval duration and a start or stop time. Another approach may be to have an entry not only for each collector interval but also for each mutator interval. In its simplest form, such an array's entries could be limited to, say, start times, with the type of interval being implied by, say, the entry address's third- or fourth-last bit (if the entries are, respectively, $2^{3-1}=4$ or $2^{4-1}=8$ bytes in size).

An approach that is even more compact employs only two words. Each bit in one of the words could represent a time interval whose duration is, say, $\frac{1}{64}$ of the time-slice value and would indicate whether it was the mutator or the collector that was executing during the majority of that time interval. The other word would represent the last time the first word was updated or otherwise identify one of the bits. At the cost of a coarser granularity, a single word could hold both values.

In short, the particular nature of the utilization log is not important so long as it logs usage to the desired degree of accuracy (which may be quite modest). We will therefore assume the FIG. 7 approach for the remainder of the discussion. Those skilled in the art will recognize, though, that many systems are significantly more complex than the one that for the sake of explanation we have assumed here. In particular, many systems employ multiple simultaneously operating processors, some of which may be executing the garbage collector at the same time as others are executing the mutator. Even in a uniprocessor system, different threads may be executing the mutator and collector concurrently. In such systems, the desired accuracy may necessitate a more complex database. For example, interval information may not just indicate that the collector or the mutator was executing during that interval but instead give the percentages of system resources respectively used by the mutator and collector.

Also, the MMU specification may not in all embodiments be expressed in terms of time explicitly. One reason for this arises from the fact that the purpose of an MMU specification is usually to ensure that enough resources are devoted to a task to allow it to be accomplished in the given time-slice duration. Since different machines do not necessarily execute instructions at the same rate or have the same instruction sets, the percentage of time that has to be dedicated to mutator execution to provide the required real-time behavior is not in general the same in different environments. For that reason, some embodiments may express the minimum mutator duration in terms of, say, some number of "benchmark instructions," which would translate to different real-time durations in different environments.

For example, suppose that the specification for a given program is based on a task that takes 600 million instructions on a benchmark type of RISC machine and has to be completed within 500 msec. Rather than express that explicitly as imposing a limit of 200 msec. of collection time in any 500 msec. time slice, which would be appropriate if that program is running on a RISC machine of that type that executes two billion instructions per second but may not be appropriate for a slower machine or one whose instruction set is different, some embodiments may express the specification as the requirement that at least 600 million benchmark instructions in every 500 msec. be employed by the mutator and translate that as appropriate to the local environment. Then, if the same program is running on a CISC machine whose instructions are in some sense half again as powerful on average as the benchmark machine's but that executes only one billion instructions per second, that same specification be interpreted as dictating a limit of 100 msec.—or 100 million instructions' worth—of collection in any 500 msec. time slice., i.e., in any time slice in which 500 million instructions can be executed. And other embodiments may express the specification in other ways.

Note also that some embodiments may employ the invention in such a way that the specification tends to be met only in certain circumstances. Consider a multitasking environment, for example. In such an environment, the specification should ideally be so implemented for a given process as to take into account any other processes that are running on the same machine concurrently. But there may be applications in which the difficulties of doing so outweigh the benefits. In some such cases there may still be value in so implementing the present invention's teachings as only to take the subject process into account, since operation would still tend to comply with the specification during periods in which the subject process is not suspended. In other periods, the effective real-time time-slice duration would expand. For example, a nominal 500-msec. MMU time slice for a program executing as a subject process could in real time span 1200 msec., of which the subject process uses only the first 200 msec. and the last 300 msec. Although the specification would thereby tend to be violated during time slices in which the subject process is suspended for a time, using the invention in this way could still be beneficial Independently of how the collector maintains the usage log, it will in accordance with the present invention use it to determine whether candidate collection pauses will conform to the MMU specification. This may come up, for example, in determining the collection set's makeup. As was mentioned above, a collector that employs the garbage-first approach will from time to time perform a full-heap marking operation and use the results, together with estimates of various regions' costs of collection, to identify regions whose collection is most attractive. For example, it may identify the regions whose collection cost per unit of reclaimed memory is lowest. Not only must the collector determine which regions are the most-attractive candidates for collection-set membership, but it must also decide how many such attractive regions to include in the collection set. It also needs to determine when a collection pause should begin.

MMU tracking can be used to produce results that the collector can use in making such decisions. From its estimates of the time required to collect the various regions, for example, it can so select the collection-set size and/or collection-pause timing that the MMU criterion will be satisfied if the estimates are not exceeded. In some embodiments, the collector will choose only collection sets that it thereby determines should satisfy the MMU specification. In most implementations, the policy will be to depart from that restriction under certain circumstances, such as when the available heap space falls below a minimum level.

For the sake of simplicity, though, let us assume that a collector's policy is to follow the MMU specification as strictly as the accuracy of its collection-cost estimates enable it to and that it is using the MMU tracker to determine how much time it can allow a collection pause starting at some predetermined time to take. We will take the MMU specification to be a time slice of 500 msec. and minimum-mutator-utilization percentage of 60%: the maximum permissible garbage-collection-duration pause is 200 msec. Let us assume further that the predetermined time is the current time and that the current time is t=700 msec.

One approach that can be employed in accordance with the present invention is simply to calculate from the utilization log the amount of collection time contained in the 500-msec. time slice that ends at t=700 msec. and subtracting the result from the MMU-specification maximum. The result will be a compliant pause time, but not necessarily the maximum such pause time. Preferably, the collector will at least identify (but not necessarily use) the maximum compliant collection-pause duration, and a routine such as the one that FIG. 9 depicts can be used for this purpose.

As block 68 indicates, that routine initially assumes that the permitted pause is the MMU-specification maximum, which, as was just explained, is 200 msec. in the assumed scenario. That means that the candidate garbage-collection pause will end at time t=900 msec. The assumed MMU specification specifies a time-slice duration of 500 msec., so the assumption of a 200-msec. pause starting at t=700 msec. can be thought of as defining a test time slice that, as FIG. 8 shows, begins at time t=400 msec. and ends at time t=900 msec. FIG. 9's block 70 represents computing that time slice's start time.

Figure 9:
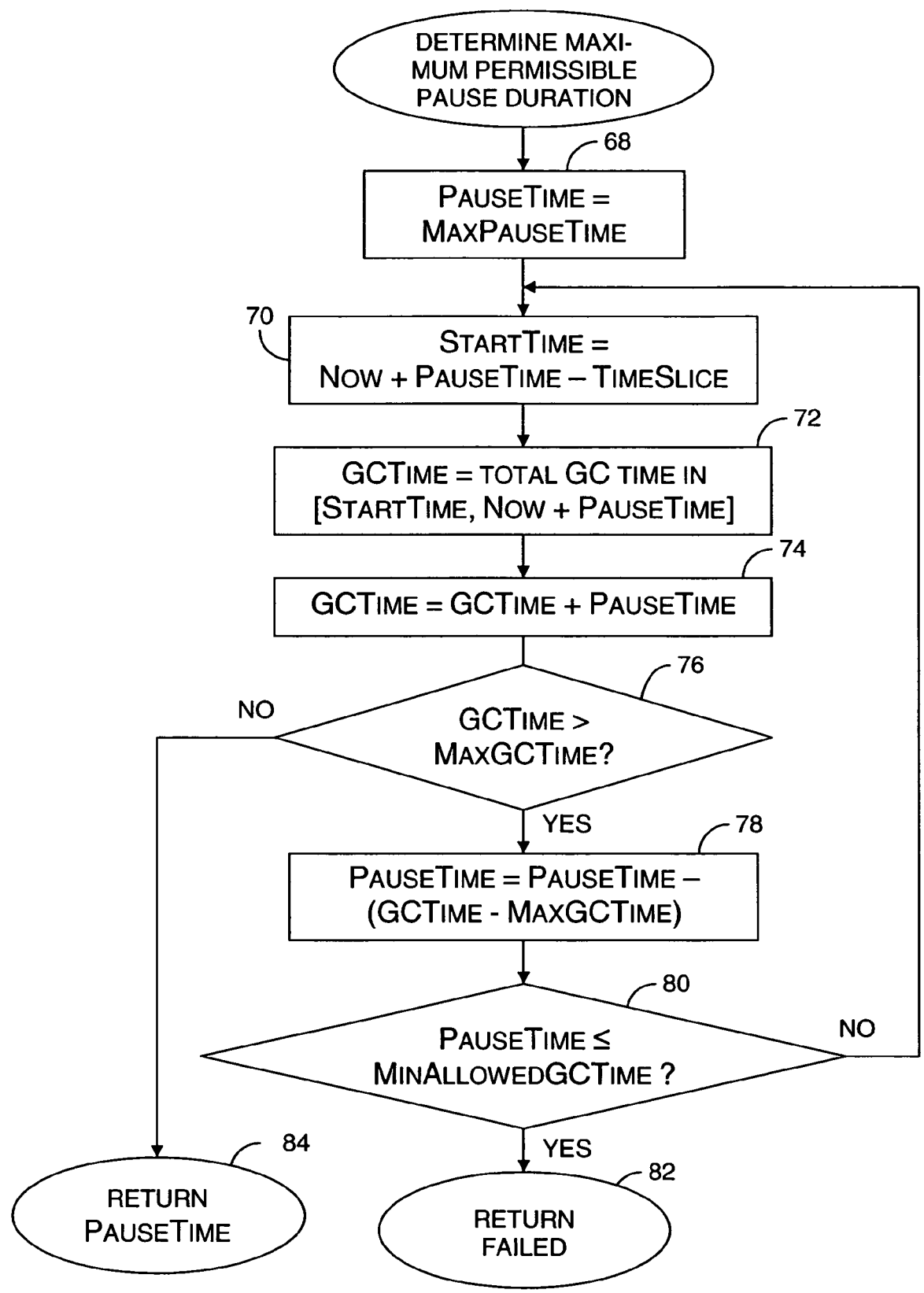
FIG. 9 is a flow chart of a routine for determining the maximum duration of a collection pause that complies with a given MMU specification and begins at a given time.

The FIG. 9 routine then determines how much time within that time slice will have been taken up by garbage collection (or, equivalently, how much of the time slice mutator operation claims) if the maximum pause time is permitted. To do this, it adds the candidate pause's duration to the amount of time that FIG. 7's array 62 indicates has occurred since the test time slice started. Blocks 72 and 74 represent this operation. According to the assumed MMU specification, no 500-msec. time slice can include more than 200 msec. of garbage collection, so FIG. 9's block 76 determines whether the candidate pause time will violate that requirement.

In the scenario that FIG. 8 depicts, it does. The test time slice does not include the garbage-collection time recorded as having occurred between times t=100 msec. and t=150 msec., since that interval occurred more than 500 msec before the time when the pause is to begin. In fact, since that interval ended more than 500 msec. before the current time t=700 msec., the MMU tracker will never use that interval again in assessing MMU-specification compliance, so the MMU tracker can delete that interval from its log. The test time slice does not include the interval that occurred between times t=250 msec. and t=300 msec., either, because that interval occurs more than 500 msec. before the candidate interval ends. That interval should be kept in the log, though, because it does not end more than 500 msec. before the current time, so it could conceivably fall within a test time slice that can still be considered.

But the test time slice that FIG. 8 depicts does include the interval that occurs between times t=400 msec. and t=500 msec., so the total is 100 msec.+200 msec.=300 msec. Since this exceeds the 200-msec. maximum, the MMU tracker cannot recommend that pause time. Instead, it adopts a new candidate pause time; it adjusts the previous candidate pause time downward, as FIG. 9's block 78 indicates, by the difference between the MMU-specification maximum and the test time slice's total expected garbage-collection time.

Now, it can sometimes happen that the result of the block-78 operation is a negative pause time. This will happen if the just-ended time slice—in the illustrated scenario, the one that extends between times t=200 msec. and t=700 msec.—has violated the MMU specification by including more than 200 msec. of garbage-collection time. It can also happen that the block-78 operation's result is zero or a value too short for any meaningful collection activity to occur. As blocks 80 and 82 indicate, the routine tests for this condition and, if it is met, returns an indication that no specification-compliant pause is currently possible.

In the illustrated scenario, though, the new pause time that the block-80 step computes is positive, so the routine returns to the block-70 operation of computing the test time slice's starting time from the new candidate pause time's duration. FIG. 10 depicts the new test time slice, which starts earlier than FIG. 8's test time slice. In the illustrated scenario it does not thereby incorporate more recorded garbage-collection time, so the new candidate pause time exactly meets the MMU specification. As FIG. 9's blocks 76 and 84 indicate, the routine therefore returns the candidate pause time as the MMU tracker's suggestion for a pause time. In other situations, of course, thus adjusting the test time slice can incorporate more recorded garbage-collection time and thereby cause one or more further loops.

Note that the FIG. 9 routine employed only a couple of test time slices in that scenario, whereas the MMU specification imposes a requirement on every one of the infinite number of 500-msec. time slices that include any portion of the proposed collector pause. But we have recognized that the determination just described actually proves that there is no such time slice in which the amount of collection time exceed the MMU-specification maximum. To appreciate this, consider the test time slice that ends at the end of the resultant suggested collection pause. Since no new collection pause follows the test time slice, no later time slice can have more collection time than the test time slice. Any time slice that contains some of the suggested pause but ends before the end of the test time slice will include less of the suggested pause than the test time slice. Of course, it may also include more of some previous pause, but that additional contribution can at most cancel out the decrease in the suggested pause's contribution. Therefore, no previous time slice that includes any of the suggested time slice can include any more collection-pause time than the test time slice can.

As was mentioned above, the collector may use this result to determine how large to make the collection set. For example, it may monitor collection-pause time on an ongoing basis and determine how long an average region takes to be collected, and use that average value in determining how many regions the collection set can contain without being likely to violate the MMU specification. Preferably, though, the collector uses more-region-specific information for this purpose, taking into account, for example, how much of a region's contents a marking operation has indicated to be reachable, how large the region's remembered set is, etc.

Figure 11A:
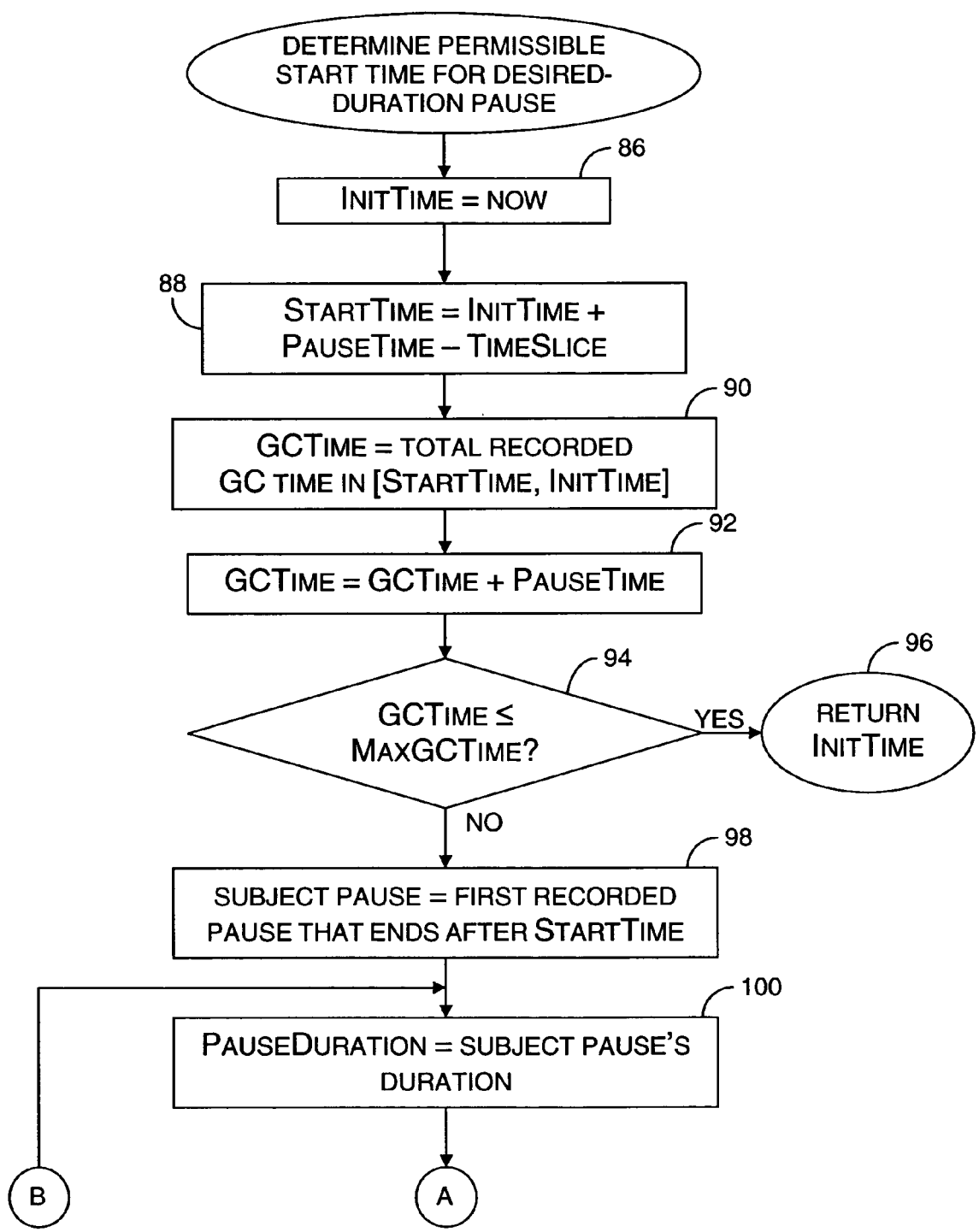
FIGS. 11A and 11B (together, "FIG. 11") constitute a flow chart of a routine for determining the earliest time at which a collection pause of a given duration can begin and still comply with a given MMU specification.

In any event, the FIG. 9 routine's purpose is to determine how long a pause that is to start immediately can be and still comply with the MMU specification. A related problem is to determine the earliest time when a pause of a predetermined length can begin without violating that specification. FIG. 11 depicts a routine for making that determination.

Block 86 represents initially assuming that the pause can begin immediately, and block 88 represents computing the resultant test time slice's start time. (We assume here that the requested pause time does not exceed the MMU-specification maximum. One way to respond if it does is to substitute that maximum pause time for the requested pause time and issue an appropriate indication that this has been done. For the sake of simplicity, though, the drawing omits such a feature.) FIG. 12 depicts the time slice that results if the current time is t=700 msec. and the pause time is 150 msec.

FIG. 11's blocks 90 and 92 represent computing how much garbage-collector time the test time slice would include, and block 94 represents determining whether the garbage-collection time thus computed exceeds the MMU-specification maximum. If it does not, the routine returns an indication that the pause can start immediately, as block 96 indicates.

In the FIG. 12 scenario, though, the test time slice includes is 250 msec. of garbage-collection time, which exceeds the 200-msec. limit, so the garbage-collection pause has to be delayed. To this end, the routine "slides" the candidate start time forward to remove some of the recorded garbage-collection time from the resultant test time slice. Specifically, it first considers the first recorded pause interval that ends after the start of the previous test time slice. FIG. 11's blocks 98, 100, and 102 represent determining whether sliding the candidate start time forward enough to eliminate that recorded interval entirely will still leave more garbage-collection time than the MMU-specification maximum. If so, the routine considers the next recorded garbage-collection pause and makes the same determination.

Figure 11B:
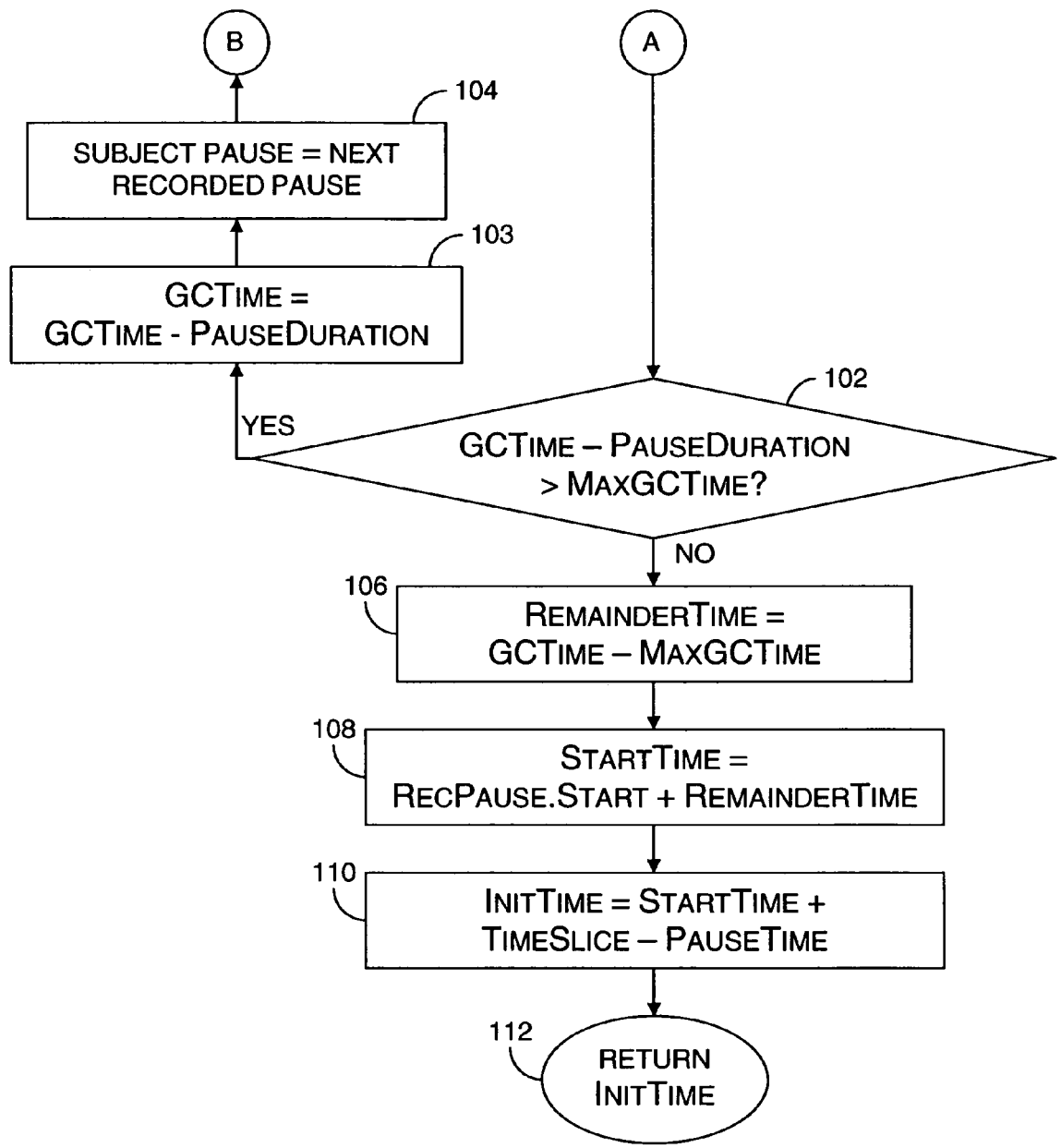

But completely eliminating the pause that begins at time t=400 would result in the test time slice's containing only 150 msec. of garbage-collection time; it would result in more delay than necessary. So, instead of sliding the test time slice forward that much, the routine slides it forward only by the difference between the MMU-specification maximum and the amount of garbage-collection time the test time slice has before sliding. FIG. 11B's blocks 104-112 represent sliding the test time slice by that amount and returning the resultant suggested collection-pause start time. FIG. 13 illustrates the result, showing that it contains exactly the maximum garbage-collection time.

Figure 14A:
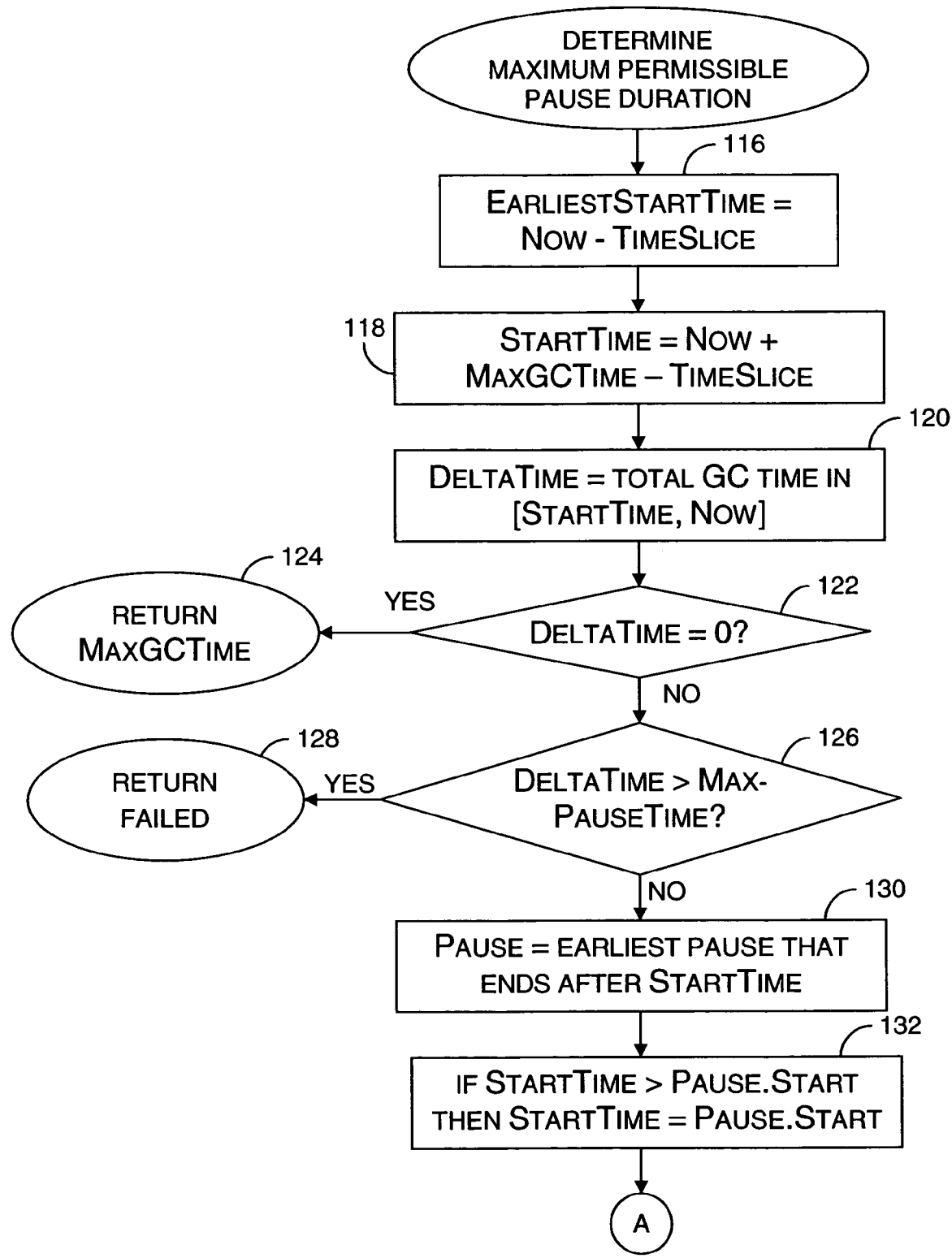
FIGS. 14A, 14B, and 14C (together, "FIG. 14") constitute a flow chart of a different is routine for determining the maximum duration of a collection pause that complies with a given MMU specification and begins at a given time.
Figure 14B:
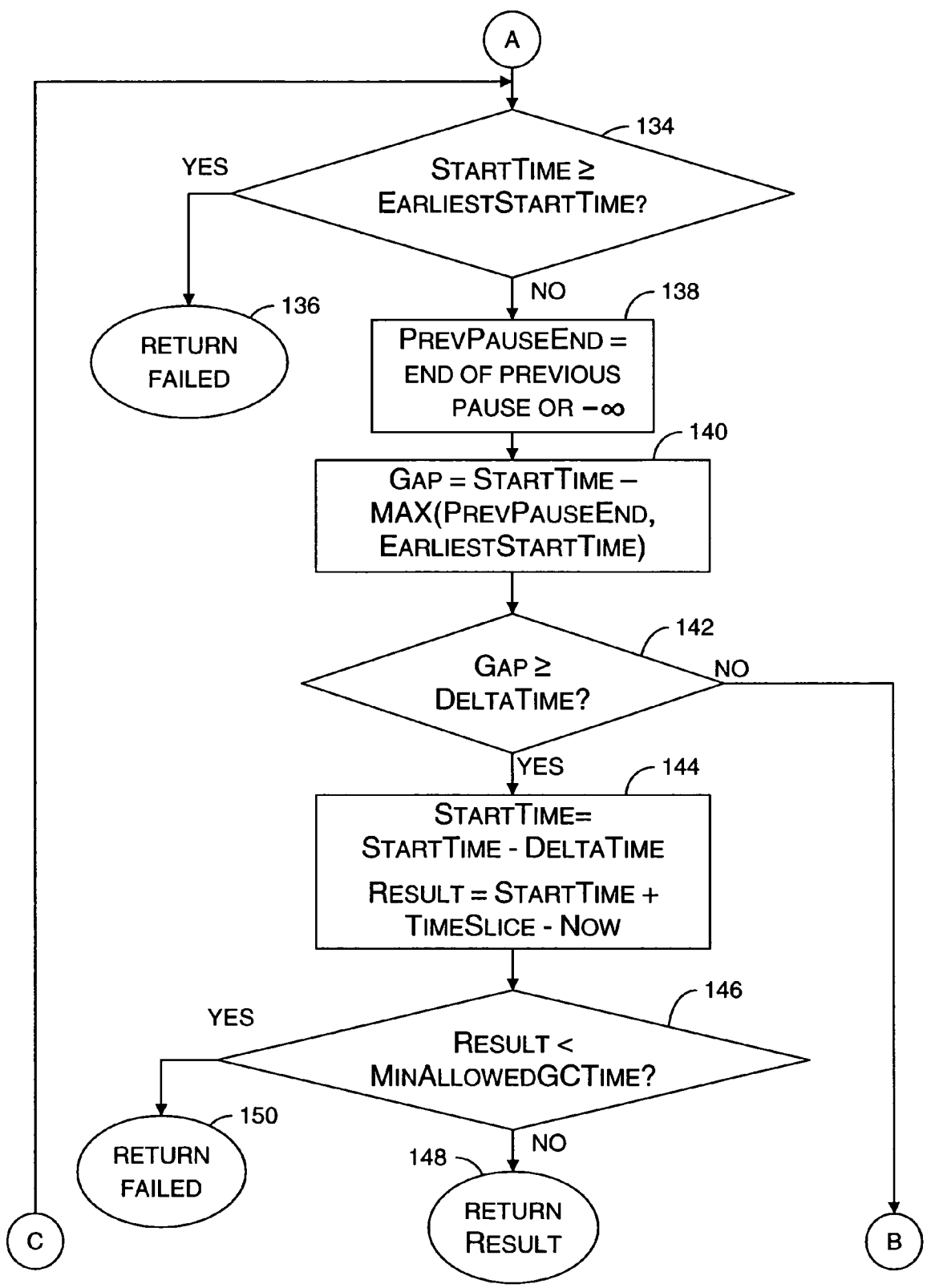
Figure 14C:
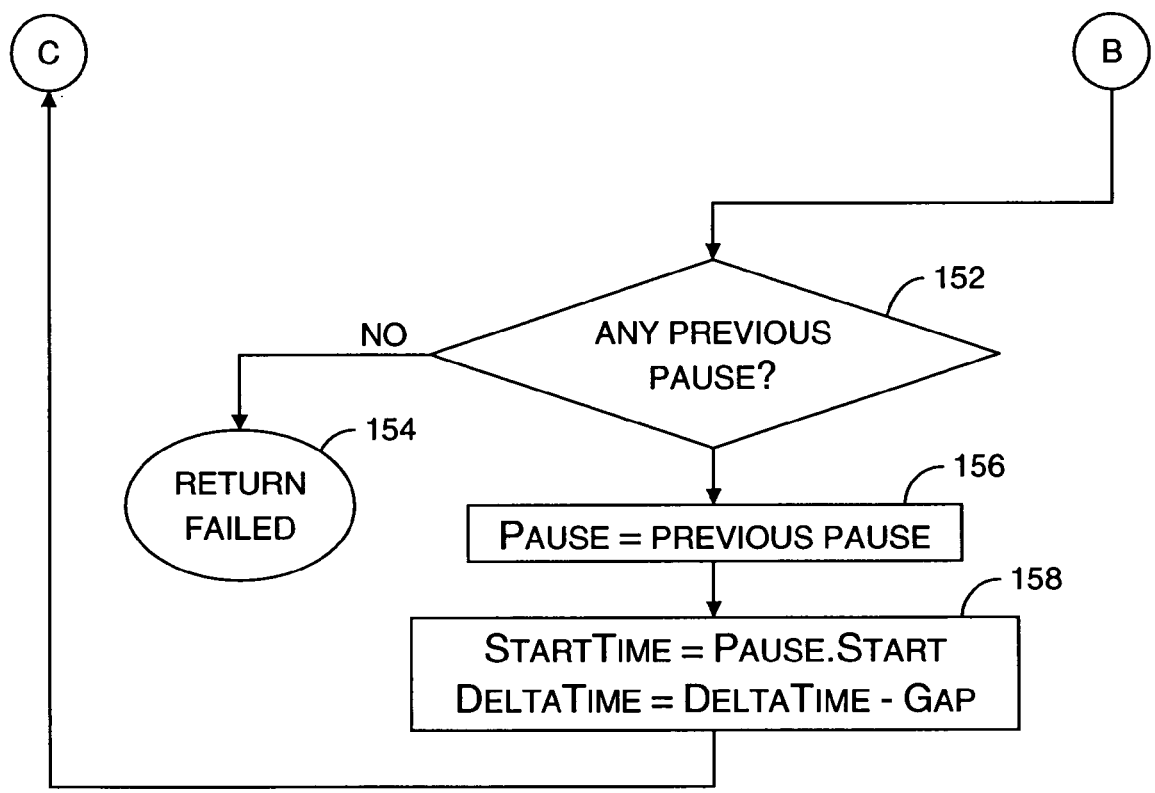

Of course, the routines set forth in FIGS. 9 and 11 are merely exemplary; other routines can be used instead to implement the present invention's teachings. For example, it may be preferable for some applications to find a maximum pause time in a way that avoids the potentially large number of loops in which the FIG. 9 approach can result. FIG. 14 depicts a routine for doing so.

Blocks 116 and 118 represent determining the start times of the earliest and latest possible time slices that could end with the pause to be recommended. Specifically, the block-116 computation determines the earliest time at which a relevant time slice can begin, i.e., the start time of the time slice of the MMU-specified duration that ends at the current time, while block 118 represents computing the start time of a time slice would end at the end of the recommended pause if that pause lasts for the maximum permitted pause duration.

Taking the latter time slice as the test time slice, the operation that block 120 represents determines how much recorded pause time falls within the test time slice and stores this value as the amount by which the recorded and prospective garbage-collection time in the test time slice exceeds the MMU-specified maximum. If that value is zero, then the routine recommends that the pause time's duration be the MMU specification's pause-time maximum, as blocks 122 and 124 indicate. Conversely, if the garbage-collection time already recorded in that time slice already exceeds the maximum, then no pause starting at the current time can result in a compliant time slice, so the routine returns an indication, as blocks 126 and 128 indicate, that it has failed.

If the routine encounters neither of those situations, it enters a loop in which the routine slides the time slice back to reduce the recommended pause's duration and thereby attempt to make the resultant test time slice compliant. If the test time slice begins in a recorded pause interval, then the test time slice must be slid back at least as far as the beginning of that recorded pause, because, up to that point, sliding the time slice back does not reduce the total of the recorded and prospective garbage-collection time in the time slice. In operations represented by blocks 130 and 132, the routine therefore identifies the earliest recorded pause in the time slice, adopts that pause as what we will refer to a the "subject pause," determines whether the test time slice starts within that pause, and, if so, slides the start of the test time slice to the beginning of that pause.

If the test time slice is thereby slid so far back that it cannot include the current time, it can be concluded that no pause starting at the present time will reside in a compliant time slice, so the routine reports failure, as blocks 134 and 136 indicate. Otherwise, the routine prepares to slide the test time slice backward far enough to result in a compliant time slice. To this end, it determines how much of a gap there is between the start of the subject pause and either the end of previous recorded pause or the start of the above-mentioned earliest possible time slice, whichever came later. Blocks 138 and 140 represent making that determination. If the gap is at least as great as the amount by which the test time slice's recorded and prospective garbage-collection time exceeds the MMU-specified maximum, then sliding the test time slice by that excess will yield a compliant time slice. Blocks 142 and 144 represent therefore determining whether the gap is greater than the excess and, if it is, sliding the test time slice backward by the amount of the excess.

As block 146 indicates, the routine then determines whether the resultant pause duration exceeds the minimum time required if any meaningful collection activity is to occur. If so, it returns that pause duration as its output, as block 148 indicates. Otherwise, as block 150 indicates, it returns a failure indication.

If the block-142 operation instead indicates that the gap preceding the subject recorded pause is not greater than the test time slice's garbage-collection time, the test time slice's start time will have to be slid back through the entire previous recorded pause, if any, if the resultant test time slice is thereby to be made compliant. If no previous recorded pause occurs after the start of the earliest possible time slice, then no compliant time slice can result. As blocks 152 and 154 indicate, therefore, the routine returns a failure indication if there is no previous pause. Otherwise, as blocks 156 and 158 indicate, the routine adopts the previous pause as the subject pause, slides the test time slice to the beginning of the subject pause, reduces by the duration of the gap thereby traversed the value that maintained to represent the test time slice's excess garbage-collection time, and returns to the start of the loop.

A comparison of the FIG. 14 routine with the FIG. 9 routine reveals that, although the former routine is simpler and may therefore be preferred in some applications, it may in some situations end up looping many times for a given recorded pause and therefore take considerably longer to execute than the FIG. 14 routine, which loops only once for each recorded pause.

As was mentioned above, most collectors that implement the present invention's teachings will not in every case strictly follow the pause recommendations that result from the MMU-tracking operations. This is partially because the collection durations that the MMU-tracking operations employ are only estimates of how long various collection operations will take. Additionally, other factors, such as whether the system is running low on heap space, may take precedence over complying with the MMU specification. But such collectors will in some circumstances attempt to schedule pauses in accordance with candidate pauses' compliance with the MMU specification. By employing such MMU tracking, a garbage collector can flexibly schedule its collection pauses in such a way as to tend to satisfy a prescribed MMU specification. The present invention therefore constitutes a significant advance in the art.

What is claimed is:

1. For performing garbage collection for a mutator executing on a computer system, a method comprising:
   A) providing a minimum mutator utilization (MMU) specification that dictates an MMU-specification time-slice duration and a maximum collection duration;
   B) maintaining a utilization log by recording, in response to computer-system usage, information from which amounts of system usage by the mutator and a garbage collector can be determined;
   C) employing the utilization log to make an assessment of a candidate garbage-collection interval's compliance with the MMU specification, wherein making the assessment of the candidate garbage-collection interval's compliance comprises:
   defining a test time slice, associated with that candidate garbage-collection interval, that lasts for the MMU-specification time-slice duration and ends with the end of the candidate garbage-collection interval; and
   determining, by combining the candidate garbage-collection interval's duration with the durations that the utilization log indicates for garbage-collection operations that have occurred during the test time slice and comparing the result with the maximum collection duration, whether the durations of garbage-collection operations that fall within the test time slice exceed the maximum collection duration;
   D) scheduling garbage-collection operations in accordance with that assessment; and
   E) reclaiming memory of the computer system for reuse by executing scheduled garbage-collection operations.

2. A method as defined in claim 1 wherein
   A) the candidate garbage-collection interval has a predetermined duration; and
   B) if the result of the assessment is a determination that the candidate garbage-collection interval would violate the MMU specification, the method additionally includes, in at least some circumstances, making an assessment of a further candidate garbage-collection interval, which starts later than the previous candidate garbage-collection interval and has the predetermined duration.

3. A method as defined in claim 2 wherein the time at which the further candidate garbage-collection interval starts is later than the previous candidate garbage-collection interval by the amount by which the durations of garbage-collection operations that fall within the test time slice associated with the previous candidate garbage-collection interval exceed the maximum collection duration.

4. A method as defined in claim 1 wherein
   A) the candidate garbage-collection interval begins at a predetermined start time; and
   B) if the result of the assessment is that the candidate garbage-collection interval would violate the MMU specification, the method additionally includes, in at least some circumstances, additionally making an assessment of a further candidate garbage-collection interval, which starts at the predetermined start time and has a duration less than that of the previous candidate garbage-collection interval.

5. A method as defined in claim 4 wherein the duration of the further candidate garbage-collection interval is less than that of the previous candidate garbage-collection interval by at least the difference between the maximum collection duration and the durations of the garbage-collection operations that fall within the test time slice associated with the previous candidate garbage-collection interval.

6. A computer system configured by machine-readable instructions to execute a mutator and a garbage-collector therefore and to operate the garbage collector using steps comprising:
   A) providing a minimum mutator utilization (MMU) specification that dictates an MMU-specification time-slice duration and a maximum collection duration;
   B) maintaining a utilization log by recording, in response to computer-system usage, information from which amounts of system usage by the mutator and the garbage collector can be determined;
   C) employing the utilization log to make an assessment of a candidate garbage-collection interval's compliance with the MMU specification, wherein making the assessment of the candidate garbage-collection interval's compliance comprises:
      defining a test time slice, associated with that candidate garbage-collection interval, that lasts for the MMU-specification time-slice duration and ends with the end of the candidate garbage-collection interval; and
      determining, by combining the candidate garbage-collection interval's duration with the durations that the utilization log indicates for garbage-collection operations that have occurred during the test time slice and comparing the result with the maximum collection duration, whether the durations of garbage-collection operations that fall within the test time slice exceed the maximum collection duration;
   D) scheduling garbage-collection operations in accordance with that assessment and
   E) reclaiming memory of the computer system for reuse by executing scheduled garbage-collection operations.

7. A computer system as defied in claim 6 wherein
   A) the candidate garbage-collection interval has a predetermined duration; and
   B) if the result of the assessment is a determination that the candidate garbage-collection interval would violate the MMU specification, the machine-readable instructions additionally configure the computer system to, in at least some circumstances, make an assessment of a further candidate garbage-collection interval, which starts later than the previous candidate garbage-collection interval and has the predetermined duration.

8. A computer system as defined in claim 7 wherein the time at which the further candidate garbage-collection interval starts is later than the previous candidate garbage-collection interval by the amount by which the durations of garbage-collection operations that fall within the test time slice associated with the previous candidate garbage-collection interval exceed the maximum collection duration.

9. A computer system as defined in claim 6 wherein
   A) the candidate garbage-collection interval begins at a predetermined start time; and
   B) if the result of the assessment is that the candidate garbage-collection interval would violate the MMU specification, the machine-readable instructions additionally configure the computer system to, in at least some circumstances, make an assessment of a further candidate garbage-collection interval, which starts at the predetermined start time and has a duration less than that of the previous candidate garbage-collection interval.

10. A computer system as defined in claim 9 wherein the duration of the further candidate garbage-collection interval is less than that of the previous candidate garbage-collection interval by at least the difference between the maximum collection duration and the durations of the garbage-collection operations that fall within the test time slice associated with the previous candidate garbage-collection interval.

11. A storage medium containing instructions readable by a computer system to configure the computer system to execute a mutator and a garbage collector therefore and to operate the garbage collector using steps comprising:
    A) providing a minimum mutator utilization (MMU) specification that dictates an MMU-specification timeslice duration and a maximum collection duration;
    B) maintaining a utilization log by recording, in response to computer-system usage, information from which amounts of system usage by the mutator and the garbage collector can be determined;
    C) employing the utilization log to make an assessment of a candidate garbage-collection interval's compliance with the MMU specification, wherein making the assessment of the candidate garbage-collection interval's compliance comprises:
       defining a test time slice, associated with that candidate garbage-collection interval, that lasts for the MMU-specification time-slice duration and ends with the end of the candidate garbage-collection interval; and
       determining, by combining the candidate garbage-collection interval's duration with the durations that the utilization log indicates for garbage-collection operations that have occurred during the test time slice and comparing the result with the maximum collection duration, whether the durations of garbage-collection operations that fall within the test time slice exceed the maximum collection duration;
    D) scheduling garbage-collection operations in accordance with that assessment and
    E) reclaiming memory of the computer system for reuse by executing scheduled garbage-collection operations.

12. A storage medium as defined in claim 11 wherein
    A) the candidate garbage-collection interval has a predetermined duration; and
    B) if the result of the assessment is a determination that the candidate garbage-collection interval would violate the MMU specification, the machine-readable instructions additionally configure the computer system to, in at least some circumstances, make an assessment of a further candidate garbage-collection interval, which starts later than the previous candidate garbage-collection interval and has the predetermined duration.

13. A storage medium as defined in claim 12 wherein the time at which the further candidate garbage-collection interval starts is later than the previous candidate garbage-collection interval by the amount by which the durations of garbage-collection operations that fall within the test time slice associated with the previous candidate garbage-collection interval exceed the maximum collection duration.

14. A storage medium as defined in claim 11 wherein
A) the candidate garbage-collection interval begins at a predetermined start time; and
B) if the result of the assessment is that the candidate garbage-collection interval would violate the MMU specification, the machine-readable instructions additionally configure the computer system to, in at least some circumstances, make an assessment of a further candidate garbage-collection interval, which starts at the predetermined start time and has a duration less than that of the previous candidate garbage-collection interval.

15. A storage medium as defined in claim 14 wherein the duration of the further candidate garbage-collection interval is less than that of the previous candidate garbage-collection interval by at least the difference between the maximum collection duration and the durations of the garbage-collection operations that fall within the test time slice associated with the previous candidate garbage-collection interval.

16. For performing garbage collection for a mutator executing on a computer system, a method comprising:

A) means for providing a minimum mutator utilization (MMU) specification that dictates an MMU specification time-slice duration and a maximum collection duration;

B) means for maintaining a utilization log by recording, in response to computer-system usage, information from which amounts of system usage by the mutator and a garbage collector can be determined;

C) means for employing the utilization log to make an assessment of a candidate garbage-collection interval's compliance with the MMU specification, wherein making the assessment of the candidate garbage-collection interval's compliance comprises:

defining a test time slice, associated with that candidate garbage-collection interval, that lasts for the MMU-specification time-slice duration and ends with the end of the candidate garbage-collection interval; and determining, by combining the candidate garbage-collection interval's duration with the durations that the utilization log indicates for garbage-collection operations that have occurred during the test time slice and comparing the result with the maximum collection duration, whether the durations of garbage-collection operations that fall within the test time slice exceed the maximum collection duration;

D) means for scheduling garbage-collection operations in accordance with that assessment and E) means for reclaiming memory of the computer system for reuse by executing scheduled garbage-collection operations.

* * * * *